United States Patent [19]
Partridge, III

[11] Patent Number: 5,473,671
[45] Date of Patent: Dec. 5, 1995

[54] SELECTIVE SCREENING OF INCOMING CALLS FOR CELLULAR TELEPHONE SYSTEMS

[75] Inventor: B. Waring Partridge, III, Mendham, N.J.

[73] Assignee: AT&T Corp., Murray Hill, N.J.

[21] Appl. No.: 212,547

[22] Filed: Mar. 11, 1994

[51] Int. Cl.⁶ .............................. H04Q 7/22; H04M 1/56; H04M 15/00; H04M 3/42

[52] U.S. Cl. .............................. 379/59; 379/58; 379/142; 379/127; 379/210

[58] Field of Search .................................. 379/58, 59, 211, 379/212, 219, 221, 273, 67, 142, 89, 214, 210, 127

[56] References Cited

U.S. PATENT DOCUMENTS 5,029,196  7/1991  Morganstein .............................. 379/67
5,329,578  7/1994  Brennan et al. .......................... 379/67

OTHER PUBLICATIONS

U.S. Pat. No. 5,222,125, filed on Sep. 3, 1991 and issued on Jun. 22, 1993 to Carroll W. Creswell et al.

Primary Examiner—Curtis Kuntz
Assistant Examiner—Michael B. Chernoff
Attorney, Agent, or Firm—Steven R. Bartholomew

[57] ABSTRACT

In connection with cellular telephones, the divergent call treatment technique of the present invention is used to particular advantage. A list of accepted callers is maintained by a service supplier. When a call comes in, a determination is made as to whether the caller is an "accepted" caller. If so, the call is forwarded to the cellular telephone. Otherwise, the caller is offered the option to pay for the call. A willingness on the part of the caller to pay for the call is indicated by a signal from the caller, such as pressing a key on a DTMF pad. In response to such a signal, the call is forwarded to the cellular telephone. In the absence of such a signal, the call is disconnected or diverted.

10 Claims, 2 Drawing Sheets

SELECTIVE SCREENING OF INCOMING CALLS FOR CELLULAR TELEPHONE SYSTEMS

BACKGROUND OF THE INVENTION

This invention relates generally to systems and methods for screening incoming telephone calls and, more specifically, to techniques for selectively screening calls in the context of cellular telephony.

Various techniques have been developed which enable the telephone subscriber to screen incoming calls. For example, a telephone answering machine may be activated to answer all incoming telephone calls, to even in the presence of the called party. However, this technique is not preferred because callers may hand up immediately after hearing the called party's prerecorded message, on the assumption that the called party is not present. Furthermore, a connection is made between the calling and the called party, regardless of the caws origin or the calling party's status.

Another prior art technique for call screening is known as "caller ID". With the advent of the "caller ID" feature, telephone subscribers can identify callers through a display that is activated during the ringing interval and which displays the number of the calling party. The subscriber has the option of not answering,, the call, and typically uses the displayed information to determine his or her actions. However, one disadvantage of using "caller ID" to screen incoming calls is that the phone still rings when undesired calls come in, thereby annoying the subscriber.

Existing call screening techniques are ineffective in the environment of a typical cellular telephone system, because subscribers are billed for incoming answered calls, as well as for outgoing calls. Moreover, state-of the-art cellular systems do not even provide the "caller ID" feature. If the system subscriber receives a sufficient number of incoming calls, the subscriber's cellular phone bill may increase substantially. Unfortunately, the subscriber does not have control over the receipt of incoming telephone calls, short of leaving the telephone off-hook or letting the phone ring repeatedly. And, as if to add insult to injury, many of these incoming calls are undesired. This is a particularly problematic situation due to the recent proliferation of telemarketing schemes.

SUMMARY OF THE INVENTION

The prior art deficiencies are solved, in accordance with the disclosure herein, by maintaining a list of caller identities and by determining, via reference to this list, the type of call treatment that an incoming call should receive. This technique may be termed "divergent call treatment". The caller identities may be telephone numbers. The list of telephone numbers may be stored in the telephone company's switching facilities or in the subscriber's telephone instrument. A wide range of call treatment options are provided, and these options can be performed regardless of whether the list is maintained in the telephone company's switching facilities or in the subscriber's telephone instrument.

In connection with cellular telephones, the divergent call treatment technique of the present invention is used to particular advantage. In accordance with one of the embodiments disclosed below, for example, the list maintained is a list of accepted callers, and it is maintained by the service supplier. When a call comes in, a determination is made as to whether the caller is an "accepted" caller. If so, the call is forwarded to the cellular telephone. Otherwise, the caller is offered the option to pay for the call. A willingness on the part of the caller to pay for the call is indicated by a signal from the caller. This signal may be, for example, the pressing of one or more keys on a standard DTMF touch-tone pad, such as #1. In response to such a signal, the call is forwarded to the cellular telephone. In the absence of such a signal, the call is disconnected or diverted, for example, to the landline phone of the cellular telephone subscriber.

When the list of accepted callers is maintained in the subscriber's telephone instrument, means are included to disable the ringing signal for an interval sufficient to provide appropriate call treatment for the call and, optionally, means are included for call forwarding, and/or recording of incoming messages.

DETAILED DESCRIPTION

Figure 1:
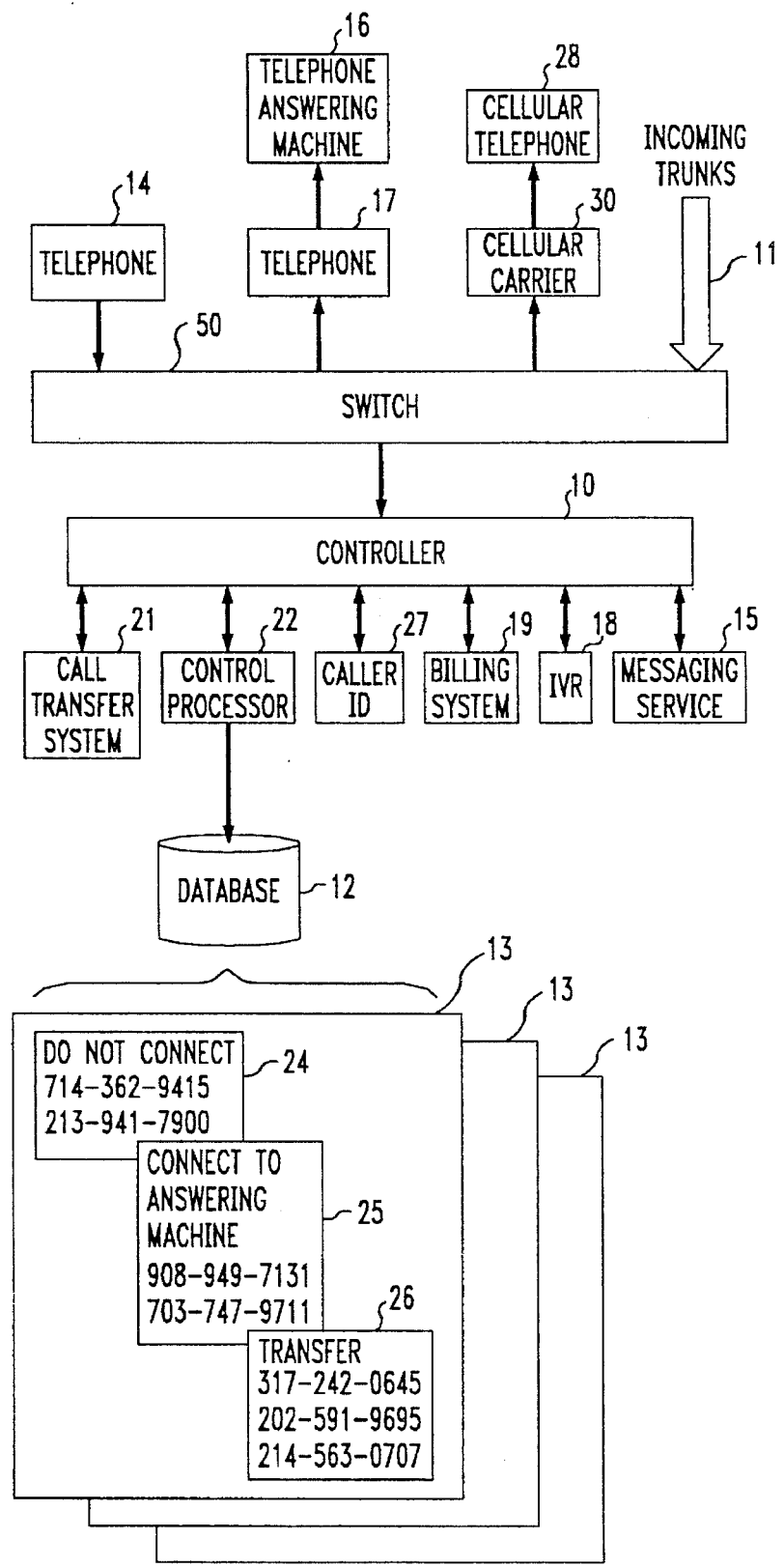
FIG. 1 is a hardware block diagram setting forth a switch-based embodiment of the present invention.

FIG. 1 depicts a block diagram of a divergent call treatment system that is closely associated with a switch. Such a system can be associated with a telephone company "central office", a tandem office, a customer premises PBX, etc. In FIG. 1, a conventional a telephone company switch 50 provides switching and other conventional features (e.g., "call waiting", "call transfer", etc.) to subscribers 14, 16, and 28. Illustratively, subscribers 14 and 16 are "plain old" telephones (POTS), while subscriber 28 is a cellular service provider that, in turn, connects to cellular telephones such as cellular telephone 30. Switch 50 is under control of controller 10. Interactive voice response system 18, billing system 19, caller ID system 27, messaging system 15, and call transfer system 21 are connected to controller 10. They can be implemented as "stand alone" adjuncts to controller 10, and they can also be implemented as part of controller 10. Controller 10 is also coupled to divergent call treatment processor 22 which similarly can be incorporated in switch 50 or be a "stand alone" adjunct processor.

Processor 22 is coupled to database 12, and database 12 contains the identities of switch 50 subscribers that receive the divergent call treatment (DCT) service. It also contains the specific requests of those subscribers. More particularly, database 12 contains a table for each destination telephone number of switch 50 that subscribes to the DCT service; e.g., telephones 14, 16 and 30. Each call treatment table 13 includes at least one call treatment page that specifies a certain call treatment for the potential callers of the table's "owner". That page may specify, for example, only the callers that should be permitted access, or only the callers that should be blocked, etc. More than one page can be included in a table 13, and FIG. 1 illustrates a table with three pages. Call treatment page 24 specifies a call treatment option of "block" for each of the telephone numbers contained therein, causing calls originating from phone numbers stored on page 24 to not be connected to the called party. Call treatment page 25 specifies a call treatment of "connect to answering machine." The answering machine may be located in association with switch 50 (element 15), or it may be an answering, machine that is customer owned The latter is described more fully below in connection with FIG. 2. Call treatment page 26 specifies a call treatment that not only attempts to complete the call but one where after a specified number of rings (e.g., 3 rings, 1 ring, 0 rings) the call is transferred to another number. All other numbers are given the default treatment, which is the normal call completion process.

As an aside, it is quite possible that the cellular service provider will maintain its own DCT system, in which case cellular telephones such as telephone 30 will not be found in database 12 but in a DCT system within, or associated with, subscriber 28. Of course, it is possible that the cellular service provider may, nevertheless, wish to subscribe to the DCT service, giving itself the option to exclude certain callers from all of its customers.

In operation, when switch 50 recognizes a request to set up a communication path to, for example, telephone 14, controller 10 requests control processor 22 to consult database 12 and determine whether telephone 14 subscribes to the DCT service. When an affirmative response is received, processor 22 utilizes caller ID information of the calling party to effect a specified call treatment. When the call arrives at switch 50 via trunks 11, processor 22 utilizes the caller ID signal provided with the incoming call (see U.S. Pat. Nos. 5,228,080 and 5,054,055 which describe the ICLID signal). When the call originates from a telephone connected to switch 50, the caller ID information is derived from the local caller ID system; i.e., element 27.

When processor 22 determines that telephone 14 subscribes to the DCT service, table 13 that is associated with telephone 14 is read. When the calling party's identity is found in page 24 of table 13 (and page 24 corresponds to the "block" list), processor 22 informs controller 10 that the called party wishes the call to be blocked, and that request is executed by controller 10. IVR system 18 may be engaged at that time to send that message to the calling party. When the caller ID is found in page 25, the incoming call is diverted to the messaging service system 15. When the caller ID is found in page 26, the incoming call is given the highest level of service; to wit, the system attempts to establish a connection to telephone 14, but when the called party does not answer, the call is transferred to another number. Lastly, when the caller ID is found in none of the table pages, then the incoming call receives the normal call handling process.

When the called party is a cellular telephone, such as telephone 30 (and that party subscribes to the DCT service), the expectation is that the customer will wish the DCT service to offer a different capability. More specifically, since cellular telephones must pay for incoming calls, it is likely that the subscriber of telephone 30 will wish to accept and pay for calls from one class of callers, (CLASS 1); will be willing to accept calls from a second class of callers—but only if they are willing to pay for them (CLASS 2); will wish to completely block certain callers (CLASS 3); and have all other callers be transferred to another communication system, e.g., home phone, secretary's phone, central office-based messaging system, etc., (CLASS 4). CLASS 2 callers who are not willing to pay for the call can be redesignated as CLASS 4 callers.

In the above description in connection with cellular telephone 30, the treatment of CLASS 2 is interactive. When a CLASS 2 caller is identified, IVR system 18 is engaged in the call treatment process. IVR system 18 informs the caller that he/she is seeking connection to a cellular telephone and that a communication path can be set up, provided that the calling party agrees to pay. Consent to pay is then indicated by the calling party, pursuant to instructions from IVR system 18, such as by pressing #1 on the DTMF key pad. In response thereto, processor 22 directs controller 10 to alert the called cellular party via cellular carrier 28. Of course, processor 22 needs to then engage billing system 46 in the process so that the proper party gets charged for the call.

IVR system 18 can be engaged in the processing of calls from parties belonging to the other classes as well, but in most of those applications the behavior is not interactive; IVR system 18 only outputs outgoing messages.

The switch arrangement of FIG. 1 includes call forwarding system 21 because this capability (or its equivalent) is needed for the DCT service; but it can also be used conventionally. Thus, for example, a customer who has an office phone (e.g. telephone 16) and a cellular phone (e.g. telephone 30) can have the "standard" call forwarding feature for his cellular phone, and the more sophisticated (and more costly) DCT service for his office phone. The customer can then divulge the cellular phone number to a select group of people, and when he/she is not close to the cellular phone, he/she can have all calls be forwarded to the office phone. Most other people would know only the office phone's number. When leaving the office, the customer—being a subscriber of the DCT service— can direct the switch 50 to forward all calls to the cellular phone, but only pursuant to the limitations in the customer's table 13.

Database 12 is administered by the owner of switch 50. Telephone subscribers who receive the DCT service provide that owner, e.g., the telephone company, with a list of telephone numbers with which to populate the table pages. The latter places the subscriber-furnished lists into database 12. Alternatively, the telephone company can cede some control to the subscriber and provide the subscriber with access to database 12 via IVR system 18 (see, for example, U.S. Pat. No. 5,179,585 and/or U.S. Pat. No. 5,113,430).

To enter information, a telephone subscriber accesses his/her table 13 by dialing a specified number. Thereupon, IVR system 18 assumes control and, via verbal instructions, guides the subscriber through the process of populating the table. The IVR system may include a voice recognizer or a DTMF decoder which operates as a command recognition device, implementing user-selected functions, such as adding or removing telephone numbers from the call treatment table 13.

Figure 2:
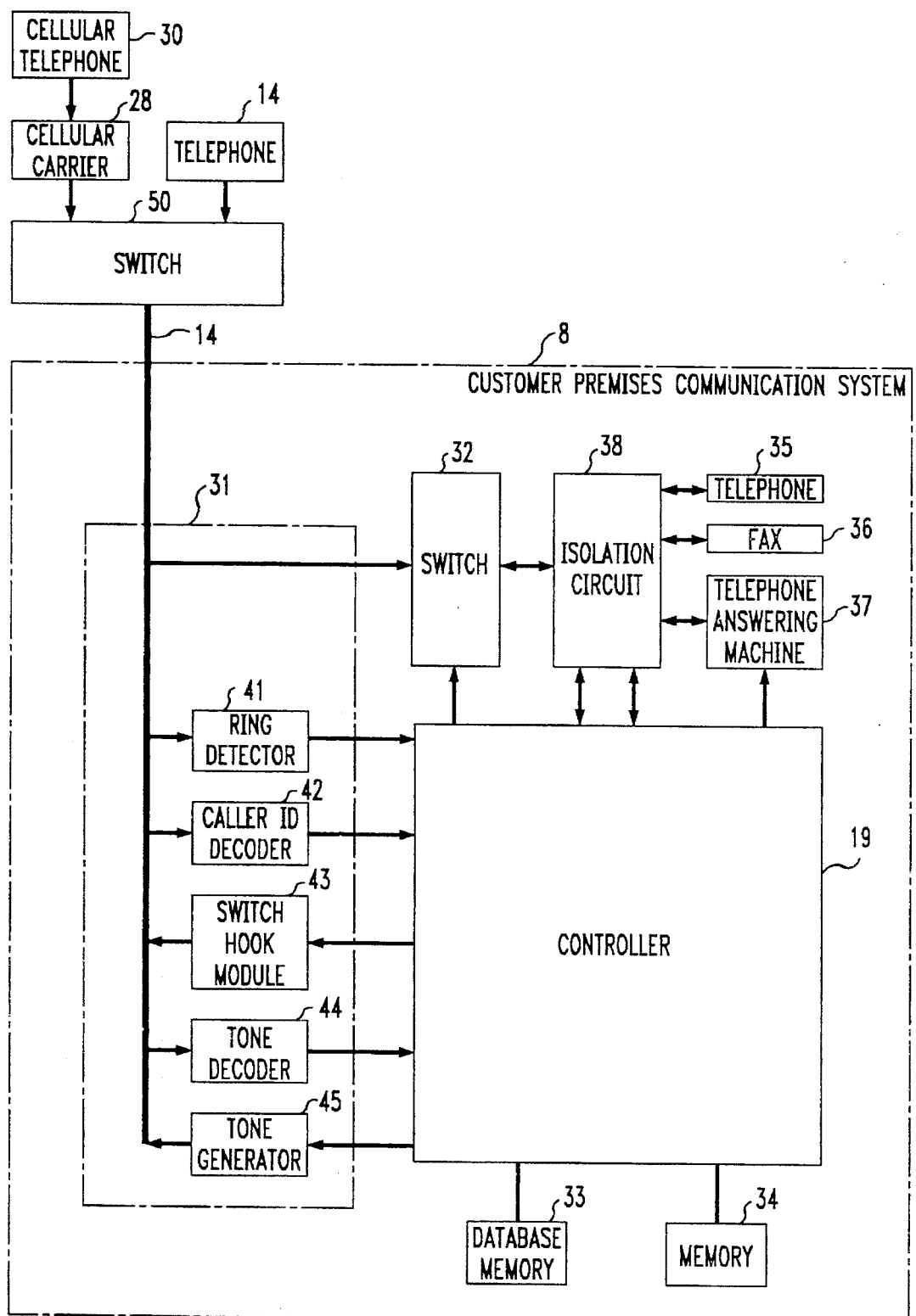
FIG. 2 is a hardware block diagram setting forth a customer premises equipment-based embodiment of the present invention.

FIG. 2 presents an embodiment where the DCT capability is incorporated in the customer's instrument. Switch 50 and elements 14, 28 and 30 in FIG. 2 are the same as in FIG. 1 and are similarly interconnected. Further, FIG. 2 includes a customer premises communication system 8 that is connected to switch 50.

The central element in system 8 is controller 19, which is connected to line interface subsystem 31, to switch 32, to database memory 33 and to the controller's program and work memory 34. Memories 33 and 34 can coexist in the same memory device, but they are shown separately in FIG. 2 for sake of simplicity of exposition. Memory 33 contains the various table pages of the DCT of system 8, and memory 34 contains all of the programs necessary for effecting the control functions of controller 19. Switch 32 connects the telephone line connecting switch 50 to system 8 to any one of the telecommunication devices that the customer has, such as "POTS" telephone 35, fax machine 36, and answering machine 37. The connection to the telecommunication devices is through dc isolation circuitry 38, which allows only the ac signals through to the telecommunication devices. The dc signals that the communication devices need are supplied by circuitry 38 under control of controller 19, and the dc controls from the telecommunication devices are routed by circuitry 38 to controller 19. Basically, circuitry 38 emulates the dial tone and "on-hook/off-hook" processes of a central office. A description of such circuitry can be found in U.S. Pat. No. 0,000,000. Advantageously, answering machine 37 is of the type that can output a variety of different outgoing messages, depending on applied control signals from controller 19. Systems 8 that have no access to such an answering machine may need to install a number of less capable machines.

Line interface subsystem 31 contains the following plurality of elements, each of which is coupled both to telephone line 14 and to controller 19.

1. Ring detect element 41, which detects the alert signal arriving from switch 50 and informs controller 19 of same.
2. Caller ID element 42, which detects the caller ID signal arriving from switch 50 (signal ICLID), decodes it, and applies the result to controller 19. One design of a controller 19 can be found, for example, in U.S. Pat. No. 5,146,490.
3. Switch hook module 43, which applies an appropriate impedance across telephone line 14. Under control of signals from controller 19 device 43 can convey other information to switch 50 by applying or removing that impedance (such as the basic, "on-hook"/"off hook" signal).
4. Tone detector 44, which detects the presence of dial tone and other signaling tones (e.g., dual tone multifrequency signals) that arrive from switch 50, and applies the results to controller 19.
5. Tone generator 45, which generates dual tone multifrequency signals to be applied to switch 50.

Since all of the above elements are well known in the art, no further description of these elements is presented herein, other than directing the reader's attention to U.S. Pat. No. 4,670,628.

In operation, when a caller wishes to reach system 8, switch 50 applies alert and ICLID signals to telephone line 14. Ring detector 41 detects the alert signal and decoder 42 decodes the caller ID. This information is provided to controller 19, whereupon the DCT process is initiated. Controller 19 consults the database pages in memory 34 and determines the kind of call treatment that is given to the incoming call.

The disclosure below describes only a number of call treatments but, of course, numerous other call treatments can be handled simply by including more pages of data in the database of memory 33, and even more options are available by allowing an incoming call to acquire different status in response to an interaction between the calling party and system 18. The treatment plan described below comprises the following caller classes:

a. Some numbers (caller ID numbers) are readily accepted, and when the subscriber (owner of system 8) is away, the incoming call is transferred to the remote telephone where the subscriber is at, even when that telephone is a cellular phone.
b. Some numbers are accepted, but when the subscriber is away and at a cellular phone, the caller is given the option to pay for the cellular call and be connected, be diverted to answering machine 37 (or fax machine 36), or be dropped.
c. Some numbers are accepted, but when the subscriber is at a cellular phone the caller is only given the option to be diverted or terminate the call.
d. Some numbers are completely blocked
e. All other numbers are given the "normal treatment".

Call Treatment (a)

Call treatment (a) is the most generous. It probably corresponds to the type of call treatment that parents, children, boss, spouse and "significant others" might get. For such callers, it is contemplated that when the subscriber is on the premises, the call is permitted to go through. When the subscriber is away, system 8 diverts the call to wherever the caller is.

Whether the subscriber is on the premises (e.g. home) or away can be determined either by some data that is available to controller 19 (e.g. in memory 34) or by the fact that the subscriber does not answer the telephone. The former approach is preferable and it can be easily attained by installing a "try number" location in memory 34 and setting it to null when the subscriber is at home. When the subscriber leaves home, the "try number" location is populated with the number at which the subscriber can be reached. One might also install a "default try number" location in memory 34 and populate it with the telephone number that is most likely to be the number where the subscriber may be, when not at home. Different logic trees may be implemented even for these callers. When the "try number" is null but the subscriber is not at home, for example, for some callers the unanswered call is diverted to answering machine 37. For other callers, the caller is asked whether the caller wishes the "default try number" to be tried. And for still other callers, the unanswered call is lo automatically diverted to the "default try number". (The manner by which "try number" and other data is inserted into memory 34 is described more fully below.)

As indicated above, when a call arrives at system 8, ring detector 41 and detector 42 combine to inform controller 19 of the ID number of the calling party. By referencing database memory 33, controller 19 determines the class of call treatment that the caller receives. When controller 19 determines that the caller is a class (a) caller, controller 19 consults the "try number" location. When that location is null, controller 19 directs switch 32 to connect line 14 to telephone 35. At the next ring interval of the alert signal, telephone 35 rings and the subscriber can answer the telephone. When the subscriber goes "off hook", controller 19 senses the condition (through the signals obtained from circuitry 38) and directs switch hook module 43 to assume the "off hook" condition. Switch 50 recognizes the "off hook" condition supplied by module 43 and completes the connection.

Should the subscriber not answer the telephone within a preselected number of rings, controller 19 directs switch 32 to connect line 14 to answering machine 37, and directs answering machine 37 to behave appropriately. This may be inviting the calling party to leave a message. Alternatively, answering machine 37 may inform the caller that the subscriber is not at home, and that, if the caller desires, the call will be forwarded to the "default try number". The caller can inform system 8 of the caller's desires by pressing specified keys on the caller's telephone instrument. Tone detector 45 detects those signals and informs controller 19. Based on the received information, controller 19 may accept a message to be recorded on answering machine 36, or forward the call.

To forward a call, system 8 utilizes the conventional "call forwarding" feature of switch 50, i.e., system 21. Switch hook module 43 is directed to sequence through appropriate states, and dial tone detector is queried. When a dial tone is detected, controller 19 directs tone generator 46 to generate DTMF signals corresponding to the number to where the call is to be forwarded. When the right response is detected by tone detector 45, switch hook 43 is directed to assume the "on hook" state, thereby completing the call forwarding process and terminating the call to system 8.

When the "try number" location in memory 34 is populated and a class (a) caller is recognized, the call forwarding process can commence immediately. It is possible, of course, to also connect answering machine 37 to line 14 and direct it output an appropriate informational message. The calling party's number can also be recorded at that time, to give the subscriber (and owner of system 8) some additional information.

Call Treatment (b)

For class (b) callers, the subscriber may decide that a call should not be forwarded to the subscriber if the "try number" is null. Alternatively, the subscriber may decide to use the "default try number" for these callers as well.

In any event, the key difference between class (a) and (b) callers is that when the number to which a call is to be forwarded is a cellular number, the call is not forwarded automatically. That is, for class (b) callers, when it is determined by controller 19 that the try number corresponds to a cellular telephone (cellular telephones numbers have easily recognized characteristics), answering machine 37 is engaged (i.e., activated and connected to line 14 via circuitry 38 and switch 32) and directed to output a message that queries whether the caller is willing to assume charges for the connection to a cellular telephone (e.g., telephone 30). Again, the calling party can express its wish by supplying a sequence of tones, and those tones are received by controller 19 via tone decoder 44.

When the response from the calling party is negative, system 8 can simply terminate the call, or invite the calling party to leave a message. The latter can be accomplished almost as easily as the former, since the answering machine is already engaged.

When the response from the calling party is affirmative, system 8 needs to perform two tasks: to request switch 50 to forward the call, and to inform switch 50 that the call to the cellular call will be paid by the calling party.

At this time, no commercial switches 50 offer the freedom for a subscriber who is forwarding a call to specify who— other than the party doing the forwarding—will pay for the call. However, since such switches are already able to respond to a control signal arriving from the subscriber, it is relative easy to provide this capability. For example, this capability can be realized by specifying a sequence, such as a "#1", that is to follow the number to which the call is forwarded. Switch 50 can then react to the "#1" signal, obtain a confirmation for billing from the calling party, and proceed to forward the call. It is a reasonably simple task to program controller 19 to output whatever sequence a particular switch 50 will require for transferring a call's billing.

Call Treatments (c) (d), (e) and (f)

When the calling party belongs to class (c), the option of forwarding calls is restricted partially, in that it is not allowed when the "try number" is a cellular phone. Implementing this call forwarding schema is fairly simple based on the processes described above.

When the calling party belongs to class (d), it is completely blocked, so no call forwarding takes place.

Lastly, class (e) parties are handled as if no call forwarding capabilities exist.

The above describes an interaction approach wherein queries and instructions are given to calling parties via voice recordings emanating from telephone answering machine 37, and calling parties' responses are assumed to be DTMF signals that are decoded by tone decoder 44. It may be noted that a more sophisticated system 8 can now be implemented with interactive voice response systems that can decode spoken speech; its only drawback is its higher current expense.

It may also be noted that switch 32 in the above description performs the rather simple tasks of connecting a telephone, or a telephone answering machine to line 14 (and sometimes both). Such simple tasks could be accomplished with merely a few switches under influence of controller 19. Switch 23 is included in FIG. 2, however, to highlight the fact that system 18 is capable of selective application of telecommunication devices to line 14. More specifically, it is expected that switch 50 will, in the near future, not only supply the ICLID signal which identifies the calling party, but also signals that specify the nature of the calling party. That party may be a computer, a fax machine, a video phone, a POTS telephone, etc. The signal supplied by switch 50 which specifies the nature of the calling party will be used by controller 19 to switch telephone line 14 to the appropriate telecommunication instrument in system 18—hence the need for switch 32.

Lastly, it may be noted that phone number data needs to be inserted into the database memory 33, the "try number" and the "default try number" data needs to be inserted into memory 34 and, in some cases, it may be desired to change some of the program options in the programs resident in memory 34. All of this data insertion can be effected through the keypad of telephone 35 in conjunction with means for decoding the DTMF signals of the keypad. Such means can be a separate decoder similar to decoder 44, or merely a switched connection of the output of telephone 35 to the input of decoder 44. To initiate the data input, the subscriber enters a predetermined code and, in response thereto, controller 19 initiates a data entering subroutine that transfers data created by the keypad to appropriate memory locations in memories 33 and 34.

I claim:

1. A method of selective cellular telephone call switching for use with a telephone call switching device and comprising the steps of:

(a) maintaining a list of one or more caller identities in a memory in a cellular telephone, each caller identity corresponding to one or more potential incoming telephone calls directed to the cellular telephone, each incoming telephone call having a ringing signal;

(b) assigning each of the caller identities stored in the memory with a call switching destination selecting at least one of (1) the cellular telephone, and (2) an alternate switching destination different from the cellular telephone;

(c) upon receipt of an incoming telephone call ringing signal directed to the cellular telephone, identifying any caller identity corresponding to the incoming telephone call, such caller identity comprising an incoming caller identity; and (d) upon identification of an incoming caller identity, the cellular telephone sending a call routing message to the telephone call switching device such that the telephone call switching device connects the incoming telephone call to the call switching destination assigned to the incoming caller identity, thereby selectively rerouting the incoming telephone call.

2. A method of selective telephone call switching as set forth in claim 1 wherein, upon receipt of an incoming telephone call having no caller identity, the incoming telephone call is switched to a default switching destination setting forth a specific switching destination for the incoming telephone call.

3. A method of selectively diverting incoming telephone calls directed towards a cellular telephone to an alternate switching destination, the incoming telephone calls each including a ringing signal, the method for use with a telephone call switching device and a cellular telephone, the method comprising the steps of:

(a) maintaining a caller identity list in a memory of the cellular telephone of one or more caller identities, each caller identity corresponding to a potential incoming telephone call;

(b) assigning each of the caller identities a call switching specification setting forth at least one of the cellular telephone and the alternate switching destination;

(c) upon receipt of an incoming telephone call ringing signal, searching the caller identity list for any caller identity and assigned call switching specification corresponding to the incoming telephone call; and (d) if any such caller identity is found in step (c), the cellular telephone sending a call routing signal to the telephone call switching device, the call routing signal causing the telephone call switching device to switch the incoming telephone call to the switching destination set forth in the call switching specification.

4. A method of selectively diverting incoming telephone calls directed towards a cellular telephone and having a ringing signal, the method for use with a telephone call switching device and comprising:

(a) storing a caller identity list of one or more caller identities in a memory in the cellular telephone, each caller identity corresponding to a potential incoming telephone call directed to the cellular telephone, the caller identity list specifying an alternate switching destination from the cellular telephone;

(b) upon receipt of an incoming telephone call ringing signal, searching the caller identity list for any caller identity corresponding to the incoming telephone call; and (c) if any such caller identity is found in step (b), the cellular telephone sending a first call routing signal to the telephone call switching device such that the telephone call switching device switches the incoming telephone call to the alternate switching destination; or (d) if no such caller identity is found in step (b), the cellular telephone sending a second call routing signal to the telephone call switching device such that the telephone call switching device switches the incoming telephone call to the cellular telephone.

5. A method for use with a telephone call switching device and a cellular telephone having incoming telephone number identification means, an accepted callers table memory means for storing an accepted callers table including at least one telephone number, telephone number comparison means for comparing a first telephone number with a second telephone number to determine whether or not said first and said second telephone numbers are identical, and signal generation means for generating a call diversion signal in response to the comparison means not detecting a match between the calling telephone number and at least one telephone number in the accepted callers table, the method providing for selective screening of incoming telephone calls directed to the cellular telephone, the method comprising the following steps:

(a) upon receipt of an incoming call ringing signal directed to the cellular telephone, identifying the incoming telephone number at the cellular telephone using the telephone number identification means;

(b) comparing the incoming telephone number with each of the telephone numbers in the accepted callers table to ascertain whether or not the incoming telephone number matches at least one of the telephone numbers in the accepted callers table; and (c) if the comparing step does not find a match, the cellular telephone transmitting a call diversion signal to the telephone call switching device causing the incoming telephone call to be diverted to an alternate switching destination other than the cellular telephone as specified by the call diversion signal.

6. Apparatus for selectively diverting incoming telephone calls comprising:

a cellular telephone having a memory in the cellular telephone;

an accepted callers table stored in the memory in the cellular telephone and including at least one incoming telephone number corresponding to a potential incoming telephone call directed to the cellular telephone;

a call diversion table stored in the memory in the cellular telephone including at least one call diversion telephone number specifying an alternate switching destination other than the cellular telephone;

incoming telephone number identification means coupled to the cellular telephone memory for identifying an incoming telephone number;

the cellular telephone having processing means including telephone number comparison means for comparing the incoming telephone number with at least one telephone number in the accepted callers table, call diversion signal generation means for generating a call diversion signal in response to the comparison means detecting no match between the incoming telephone number and each of the telephone numbers in the accepted callers table; the cellular telephone transmitting a call diversion signal to the telephone call switching device causing the incoming telephone call to be diverted to an alternate switching destination other than the cellular telephone as specified by the call diversion signal.

7. Apparatus for selectively diverting incoming telephone calls as set forth in claim 6, further including interactive voice response means responsive to a calling telephone for providing at least one menu option including a calling charge reversal option for billing the incoming call to the calling party prior to connecting the calling party to the called party.

8. A method of selective cellular telephone call switching for use in a system having a cellular carrier, equipped to identify incoming caller identities, a cellular telephone, and an interactive voice response unit coupled to the cellular carrier, the method comprising the steps of a) upon receipt of an incoming telephone call directed to the cellular telephone, the cellular carrier identifying any caller identity associated with the incoming telephone call;

b) the cellular carrier forming a communications link between the interactive voice response unit and the cellular telephone;

c) the interactive voice response unit, in response to the incoming caller identity, generating an audible prompt uniquely identifying the caller identity and asking the cellular telephone user whether or not the incoming call should be connected, instructing the cellular telephone user to enter a first DTMF tone or combination of tones if the call should be connected and a second DTMF tone or combination of tones if the call should not be connected, d) in response to DTMF tones received from the cellular telephone indicative that the incoming call should be connected, the cellular carrier connecting the incoming call to the cellular telephone; otherwise, not connecting the incoming call to the cellular telephone.

9. The method of claim 8 wherein the accepted callers table memory means stores a call diversion telephone number specifying the alternate switching destination.

10. A method for use with a telephone call switching device and a cellular telephone having incoming telephone number identification means, a call diversion table memory means for storing a call diversion table including at least one incoming telephone number corresponding to a potential incoming telephone call, assigning at least one of the incoming telephone numbers a call diversion telephone number specifying an alternate switching destination, telephone number comparison means for comparing a first telephone number with a second telephone number to determine whether or not said first and said second telephone numbers are identical, and signal generation means for generating a call diversion signal in response to the comparison means detecting a match between the calling telephone number and at least one incoming telephone number in the call diversion table, the method providing for selective screening of incoming telephone calls directed to the cellular telephone, the method comprising the following steps:

(a) upon receipt of an incoming call ringing signal directed to the cellular telephone, identifying the incoming telephone number at the cellular telephone using the telephone number identification means;

(b) comparing the incoming telephone number with each of the telephone numbers in the call diversion table to ascertain whether or not the incoming telephone number matches at least one of the telephone numbers in the call diversion table; and (c) if the comparing step finds a match, the cellular telephone transmitting a call diversion signal to the telephone call switching device causing the incoming telephone call to be diverted by the call switching device to the alternate switching destination assigned to the incoming telephone number and, if no alternate switching destination is assigned to the incoming telephone number, the telephone call switching device diverting the incoming telephone call to a default switching destination stored in the call diversion table.

* * * * *